L. A. PETERSON.
CHANGE SPEED GEARING.
APPLICATION FILED OCT. 17, 1916.
1,320,911.
Patented Nov. 4, 1919.
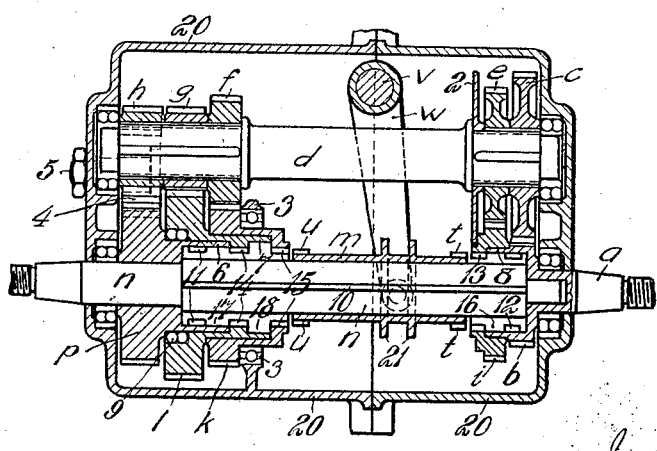
Inventor:-
Lars August Peterson,
by
B. Singer,
Atty.

UNITED STATES PATENT OFFICE.

LARS AUGUST PETERSON, OF STOCKHOLM, SWEDEN.

CHANGE-SPEED GEARING.

1,320,911.   Specification of Letters Patent.   Patented Nov. 4, 1919.

Application filed October 17, 1916. Serial No. 126,108.

*To all whom it may concern:*

Be it known that I, LARS AUGUST PETERSON, a subject of the King of Sweden, residing at Stockholm, in the Kingdom of Sweden, have invented a new and useful Change-Speed Gearing, of which the following is a specification.

The invention relates to change speed gearing for automobiles, motor cycles, trolleys, machine-tools, etc., and especially to that kind of such gearing having one or more gears fixed on the driving shaft and one or more loose gears on a driven shaft coaxial with the driving shaft, and corresponding gears on a parallel shaft and a slidable sleeve on the driven shaft and adapted to couple the latter to any of the loose gears.

One of the objects of the present invention is to afford suitable bearings for the loose gears so that these will run easy and steady and with the least possible friction. When the driven shaft must be very short as for instance in motor cycles the loose gears may be mounted on the naves of the adjacent gears and an additional fixed bearing may be used for the loose gear which is farthest from the gear $p$, if desirable.

The accompanying drawing is a horizontal section of a gearing with four speeds for forward driving and one speed for backward movement.

Referring to the drawing, the driving shaft $a$ has a fixed gear $b$ meshing with a gear $c$ on the parallel shaft $d$. The driven shaft $n$, one end of which is journaled axially in shaft $a$, has four (or any other number of) loose gears $i\ k\ l\ p$, which mesh each a gear $e\ f\ g\ h$ fixed on the parallel shaft $d$. The gear $p$ meshes gear $h$ not direct but by means of an intermediate gear 4 (the shaft of which is shown at 5). The gear $p$ thus will rotate in reverse direction.

The gear $l$ bears on an axial annular flange or nave 6 of gear $p$. The gear $k$ bears on a similar flange or nave 7 of gear $l$, and the gear $i$ bears on a similar flange or nave 8 of gear $b$.

Ball bearings 9 may be used on all these flanges or naves though on the drawing shown only on flange 6. Other means may be used for preventing axial sliding without departing from the theory of my invention and no doubt many such means may appear to those skilled in the art.

A loose sleeve $m$ on shaft $n$ is slidably connected to the shaft by keys 10 and slots so that the shaft will rotate when the sleeve is rotated. The inner diameter of the naves 6, 7, 8 is so much larger than the diameter of shaft $n$ that the sleeve $m$ can enter the annular spaces thus formed. The outside of sleeve $m$ has teeth $t$, $u$ and the inside of the naves 6, 8 have teeth 11, 12.

The naves of gears $i\ l\ k$ extend axially beyond the naves 8, 6, 7 respectively and have inwardly directed teeth or collars with such teeth 13, 14, 15 respectively. The teeth $t$ of sleeve $m$ are adapted to mesh the teeth 13 and 12 and the teeth $u$ are adapted to mesh the teeth 15, 14 and 11, when the sleeve is slid into proper positions.

The axial space 16 from teeth series 12 to teeth series 13 is larger than the axial length of teeth $t$, so that the teeth $t$ when in this space do not mesh either of the teeth series 12, 13. Between the two teeth series 11, 14 and between the two series 14, 15 are also spaces 17, 18 of larger axial width than the axial length of the teeth $u$, so that teeth $u$ do not mesh the teeth 11, 14, 15 when in said spaces 17, 18.

The arrow 19 points in the forward direction of the vehicle.

When the sleeve $m$ is slid to its uttermost forward position so as to mesh teeth 12 the shaft $n$ is driven direct by shaft $a$ and will run with the speed of said shaft $a$. When teeth $t$ mesh teeth 13, the shaft $n$ is driven by gear $e$, the shaft $d$ of which is driven by shaft $a$ by means of gears $b$, $c$. In this instance the shaft $n$ will run with lower speed than shaft $a$, as gear $b$ is smaller than gear $c$, while gears $e$ and $i$ are of identical width. When teeth $u$ mesh teeth 15, so that shaft $n$ is driven by gear $f$, the speed is still lower, and when meshing with teeth 14, so as to be driven by gear $g$ the speed is still more decreased. When teeth $u$ mesh teeth 11, the shaft $n$ is driven in the opposite direction by gear $h$ and the intermediate gear 4.

When the sleeve $m$ is in the position shown in the drawing or in a position where the teeth $t$ are in space 16 or teeth $u$ in space 18 or in space 17, the shaft $n$ is not actuated from shaft $a$.

The sliding of sleeve $m$ may be effected in any suitable way. The drawing shows an example where a vertical shaft $v$ has an arm $w$ (or two arms if preferred) which engages collar or collars 21 on the sleeve so that the sleeve will slide when turning (rotating) the shaft $v$.

The shaft $n$ may be used as the driving shaft and shaft $a$ as the driven shaft, if preferred. The gears not in actual use will then be at rest. Hence the claim should be interpreted so as to protect also such use of the gearing that is to say: the "driving" shaft and the "driven" shaft may sometimes mean the reverse.

I claim:

The combination of a driving shaft and a driven shaft arranged coaxially, a gear fixed on the driving shaft and having a hub element projecting from one side, and provided with inner teeth, a larger gear loose on said hub element and also having a hub element projecting from one side and provided with inner teeth, a parallel shaft, a fixed gear thereon engaging the fixed gear of the driving shaft, a second fixed gear on the parallel shaft and engaging the said loose gear; a loose gear on the driven shaft and having a hub element projecting from one side; a second loose gear arranged on said hub element and also having a hub element projecting from one side; a third loose gear mounted on the hub element of said second loose gear and also having a hub projecting from one side, the hub elements of said loose gears having inner teeth; a sleeve mounted on the driven shaft for rotation therewith and endwise movement thereon, said sleeve being provided with teeth for engagement with the inner teeth of either of the gears of the driving shaft, and also having teeth for engagement with the inner teeth of either of the loose gears of the driven shaft; a fixed gear on the parallel shaft, an intermediate gear engaging said fixed gear and also engaging the first named loose gear of the driven shaft, and second and third fixed gears on the parallel shaft and respectively directly engaging the second and third loose gears of the driven shaft.

LARS AUGUST PETERSON.

Witnesses:
R. AMILON,
CLAIR T. HULTBERG.

Copies of this patent may be obtained for five cents each, by addressing the "Commissioner of Patents, Washington, D. C."